United States Patent
Briscoe et al.

(10) Patent No.: US 9,998,400 B2
(45) Date of Patent: Jun. 12, 2018

(54) ATTRIBUTION OF CONGESTION CONTRIBUTIONS

(71) Applicant: BRITISH TELECOMMUNICATIONS PUBLIC LIMITED COMPANY, London (GB)

(72) Inventors: Robert John Briscoe, London (GB); Andrea Soppera, London (GB); Arnaud Jacquet, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 351 days.

(21) Appl. No.: 14/348,682

(22) PCT Filed: Sep. 27, 2012

(86) PCT No.: PCT/GB2012/000746
§ 371 (c)(1),
(2) Date: Mar. 31, 2014

(87) PCT Pub. No.: WO2013/045878
PCT Pub. Date: Apr. 4, 2013

(65) Prior Publication Data
US 2014/0301195 A1   Oct. 9, 2014

(30) Foreign Application Priority Data

Sep. 30, 2011 (EP) .................................... 11250835
Dec. 29, 2011 (GB) .................................... 1122496.1

(51) Int. Cl.
*H04L 12/801* (2013.01)
*H04L 12/911* (2013.01)

(52) U.S. Cl.
CPC ............ *H04L 47/828* (2013.01); *H04L 47/11* (2013.01)

(58) Field of Classification Search
CPC ................................ H04L 47/11; H04L 47/828
See application file for complete search history.

(56) References Cited

U.S. PATENT DOCUMENTS 6,445,707 B1 * 9/2002 Iuoras ................. H04L 12/5602
                                                            370/232
6,904,015 B1    6/2005 Chen et al.
(Continued)

FOREIGN PATENT DOCUMENTS

EP        2 040 422       3/2009
WO    WO2005/096566      10/2005
(Continued)

OTHER PUBLICATIONS

S. Floyd & V. Jacobson: "Random Early Detection gateways for Congestion Avoidance", IEEE/ACM Transactions on Networking, vol. 1-4 (397-413) (Aug. 1993).
(Continued)

*Primary Examiner* — Noel R Beharry
*Assistant Examiner* — Rodrick Mak
(74) *Attorney, Agent, or Firm* — Nixon & Vanderhye PC

(57) ABSTRACT

A method of attributing contributions to congestion of a shared resource to respective user registers, the resource being operable to serve requests for service, each of a plurality of the requests having a user indication associated therewith indicating with which of a plurality of user registers the request is associated.

15 Claims, 6 Drawing Sheets

(56) References Cited

U.S. PATENT DOCUMENTS

| | | | |
|---|---|---|---|
| 7,020,161 B1* | 3/2006 | Eberle | H04L 12/403 370/395.2 |
| 7,327,680 B1* | 2/2008 | Kloth | H04L 47/10 370/235 |
| 7,414,981 B2* | 8/2008 | Jaramillo | H04L 51/18 370/252 |
| 2003/0214954 A1 | 11/2003 | Oldak et al. | |
| 2004/0090974 A1* | 5/2004 | Balakrishnan | H04L 12/5693 370/412 |
| 2006/0077915 A1* | 4/2006 | Takase | H04L 47/10 370/299 |
| 2006/0239188 A1* | 10/2006 | Weiss | H04L 47/10 370/229 |
| 2007/0086483 A1* | 4/2007 | Greenberg | H04L 12/5693 370/468 |
| 2008/0107020 A1* | 5/2008 | Trinh | H04L 12/5693 370/229 |
| 2010/0054126 A1 | 3/2010 | Kwan et al. | |
| 2010/0091699 A1* | 4/2010 | Wu | H04B 7/18584 370/316 |
| 2012/0079065 A1* | 3/2012 | Miyamoto | H04L 12/287 709/217 |
| 2015/0372750 A1* | 12/2015 | Wu | H04B 7/18584 370/230 |

FOREIGN PATENT DOCUMENTS

| | | |
|---|---|---|
| WO | WO2006/079845 | 8/2006 |
| WO | WO 2006/082443 | 8/2006 |
| WO | WO2010/109201 | 9/2010 |
| WO | WO2011/045553 | 4/2011 |
| WO | WO 2011/107121 | 9/2011 |

OTHER PUBLICATIONS

IETF RFC 3168: Ramakrishnan, K.K., Floyd, S. & Black, D.: "The Addition of Explicit Congestion Notification (ECN) to IP", Internet Engineering Task Force Request for comments 3168 (Sep. 2001).
Parminder Chhabra, Shobhit Chuig, Anurag Goel, Ajita John, Abhishek Kumar, Huzur Saran, and Rajeev Shorey "XCHOKe: Malicious source control for congestion avoidance at Internet gateways", In Proc. IEEE International Conference on Network Protocols (ICNP'02). IEEE (Nov. 2002).
Jain, Ramakrishnan & Chiu: "Congestion Avoidance in Computer Networks With a Connectionless Network Layer", Digital Equipment Corporation Technical report DEC-TR-506 (1987).
Floyd & Fall: "Promoting the Use of End-to-End Congestion Control in the Internet", IEEE/ACM Transactions on Networking 7(4):458-472 (Aug. 1999).
ITU-T Recommendation 1.371: "Traffic Control and Congestion Control in B-ISDN" (Mar. 2004).
Mahajan, Floyd & Wetheral: "Controlling high-bandwidth flows at the congested router", Proc. IEEE International Conference on Network Protocols (ICNP'01) (2001).
Rong Pan, Lee Breslau, Balaji Prabhaker & Scott Shenker: "Approximate fairness through differential dropping", ACM SIGCOMM Computer Communication Review, 33(2):23-40 (Apr. 2003).
Smitha & Reddy: "LRU-RED: An active queue management scheme to contain high bandwidth flows at congested routers", Proc Globecomm'01 (Nov. 2001).
Briscoe et al: "Policing Congestion Response in an Internetwork Using Re-Feedback", Proc. ACM SIGCOMM'05, Computer Communication Review 35(4): 277-288 ACM Press (Aug. 2005).
B. Briscoe, A. Jacquet, T. Moncaster, A. Smith: "Re-ECN: Adding Accountability for Causing Congestion to TCP/IP", IETF Internet Draft draft-briscoe-tsvwg-re-ecn-tcp-09 (Oct. 2010).
M. Mathis & B. Briscoe: "Congestion Exposure (ConEx) Concepts and Abstract Mechanism", IETF Internet Draft draft-ietf-conex-abstract-mech-01 (Mar. 2011).
"IEEE Standard for Local and Metropolitan Area Networks—Virtual Bridged Local Area Networks—Amendment: 10: Congestion Notification", IEEE Draft standard 802.1Qau Draft 2.4 (2006) Abstract.
Turner: "New Directions in Communications", IEEE Communications Magazine 24(10):8-15 (Oct. 1986).
RFC 2697: Heinanen & Guerin: "A Single Rate Three Color Marker", Internet Engineering Task Force Request for comments 2697 (Sep. 1999).
RFC 2698: Heinanen & Guerin: "A Two Rate Three Color Marker", Internet Engineering Task Force Request for comments 2698 (Sep. 1999).
Jacquet, Briscoe & Moncaster: "Policing Freedom to Use the Internet Resource Pool", Proc Workshop on Re-Architecting the Internet (ReArch'08) ACM (Dec. 2008).
Demers, Keshav & Shenker: "Analysis and Simulation of a Fair-Queueing Algorithm", Computer Communication Review (SIGCOMM'89) 19(4):1-12 (Sep. 1989).
Distributed Weighted Fair Queuing, Cisco Feature Guide Web page http://www.cisco.com/en/US/docs/ios/11_1/feature/guide/DWFQ. html (1992).
Clark & Fang: "Explicit allocation of best-effort packet delivery service", IEEE/ACM Transactions on Networking 6(4):362-373 IEEE Press (Aug. 1998).
"Weighted Random Early Detection on the Cisco 12000 Series Router", Cisco Systems Feature Guide IOS Software Release 11.2(1)GS (Apr. 2005).
RFC 2597: Heinanen, Baker, Weiss & Wroclawski: "Assured Forwarding PHB Group", Internet Engineering Task Force Request for comments 2597 (Jun. 1999).
Bastian, Klieber, Livingood, Mills & Woundy: "Comcast's Protocol-Agnostic Congestion Management System," Internet Engineering Task Force Request for Comments 6057 (Dec. 2010).
Norberg: "uTorrent transport protocol", BitTorrent.org BitTorrent Enhancement Proposals (BEPs) 0029 (Jan. 2010) (Draft).
Search Report for GB 1122496.1, dated Apr. 27, 2012.
Search Report for GB 11250835.3 dated Dec. 20, 2011.
International Search Report for PCT/GB2012/000746, dated Nov. 26, 2012.
Written Opinion of ISA for PCT/GB2012/000746, dated Nov. 26, 2012.

* cited by examiner

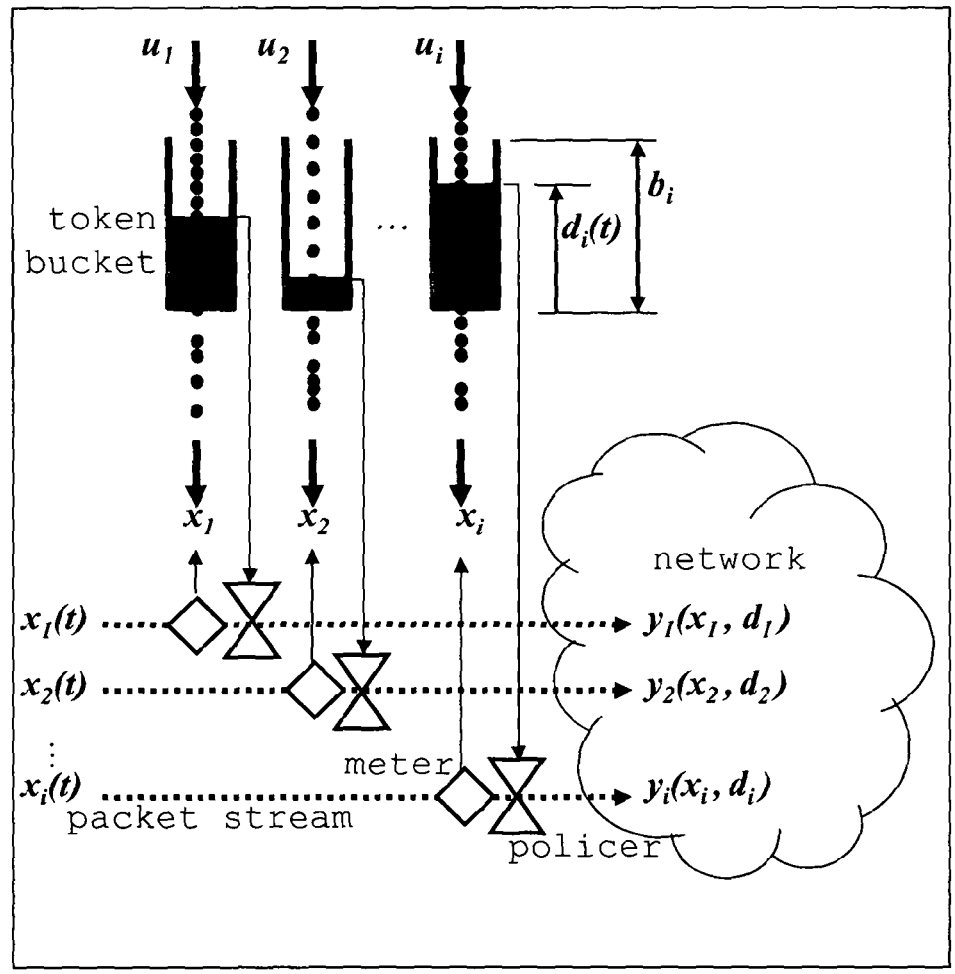
Figure 1a – Token-Bucket Policing

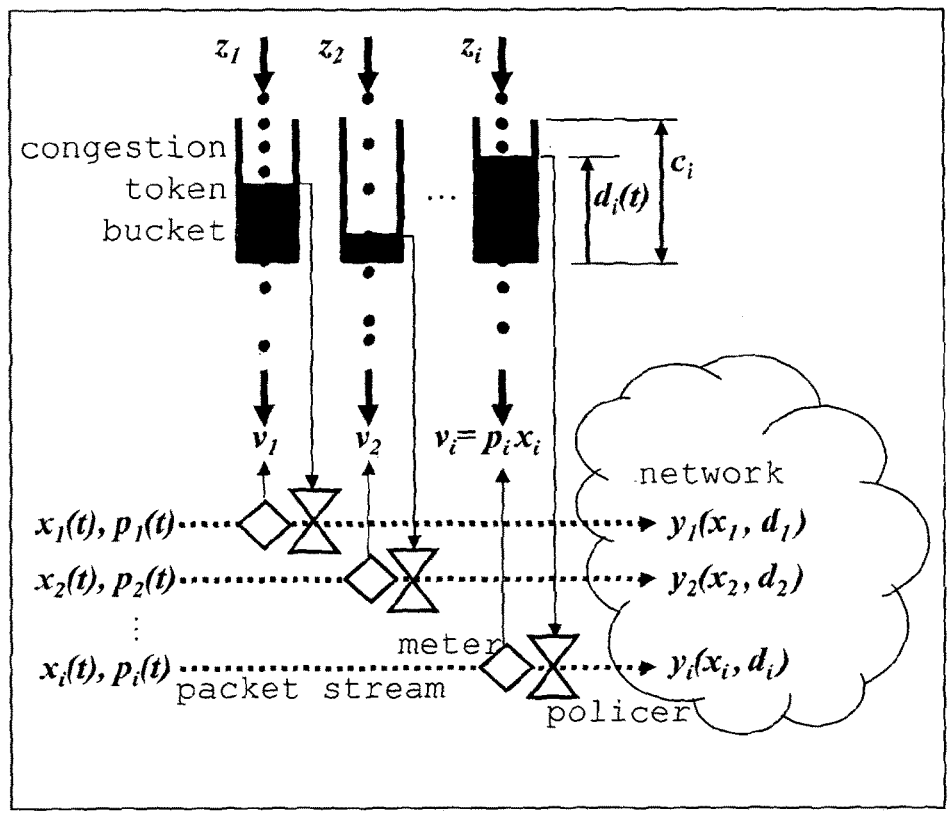
Figure 1b - In-Band-Congestion-Token-Bucket Policing
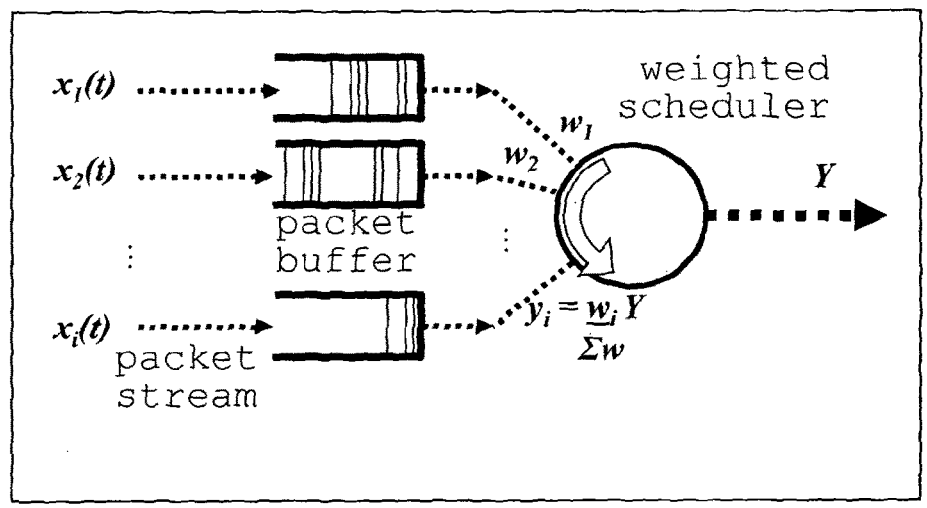
Figure 1c – Weighted Fair Queuing

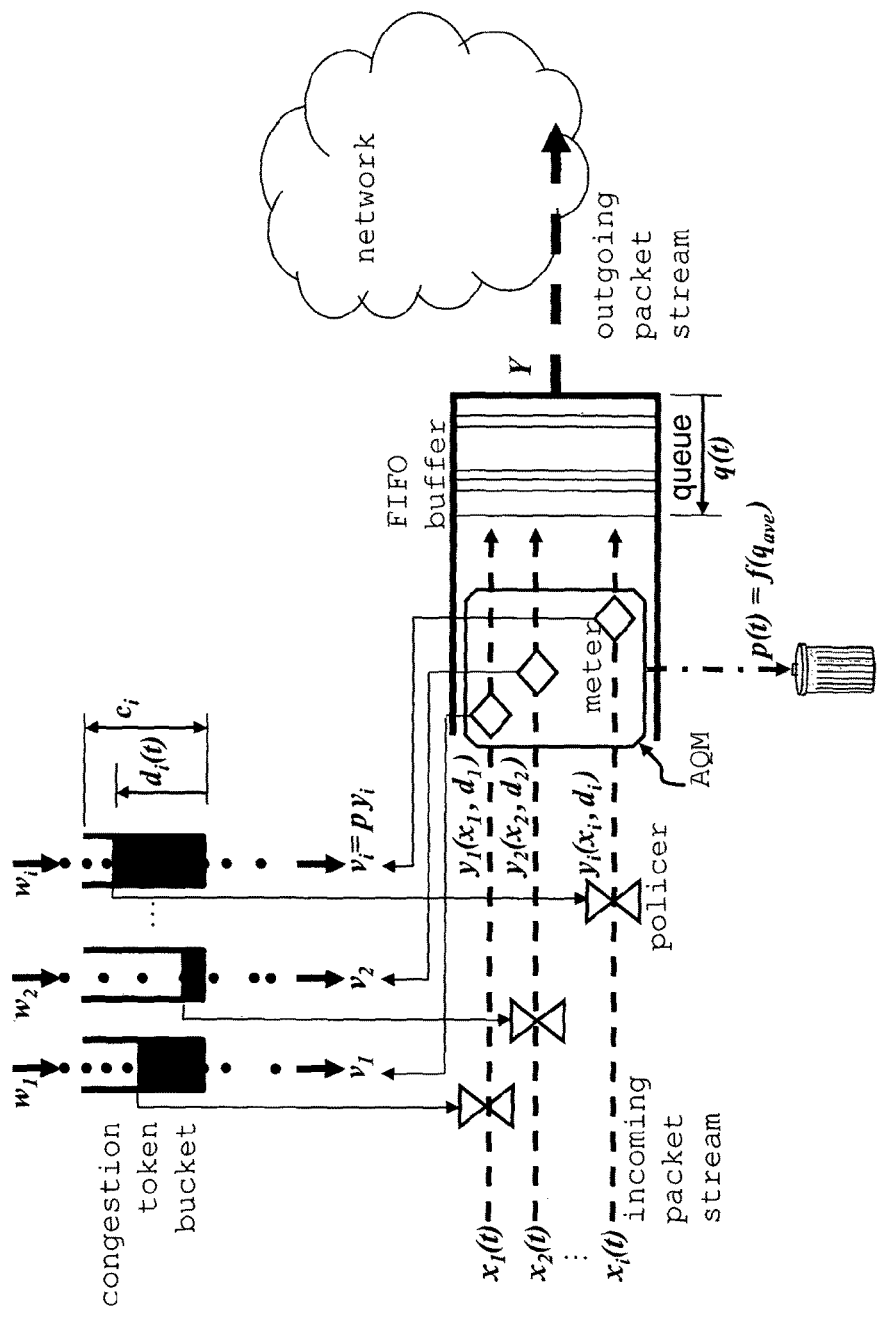
Fig 2: Out-of-band-congestion-token-bucket policing

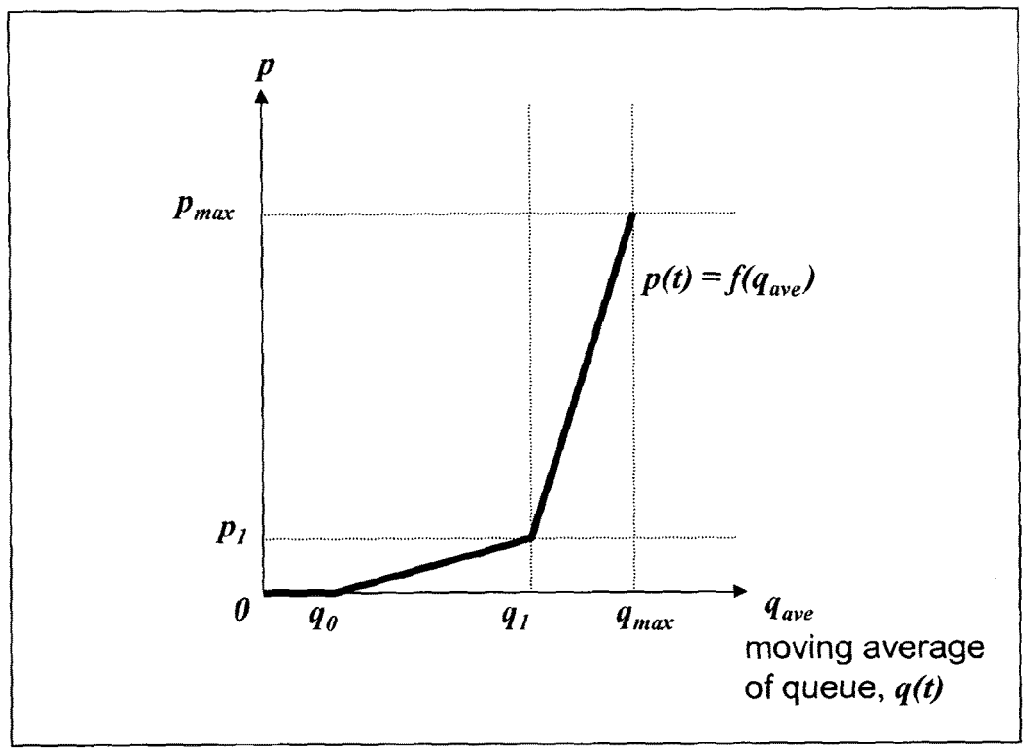
Figure 3: Active Queue Management (AQM):
Probability of discard $p(t)$ as an example function of
the moving average of the queue length $q(t)$

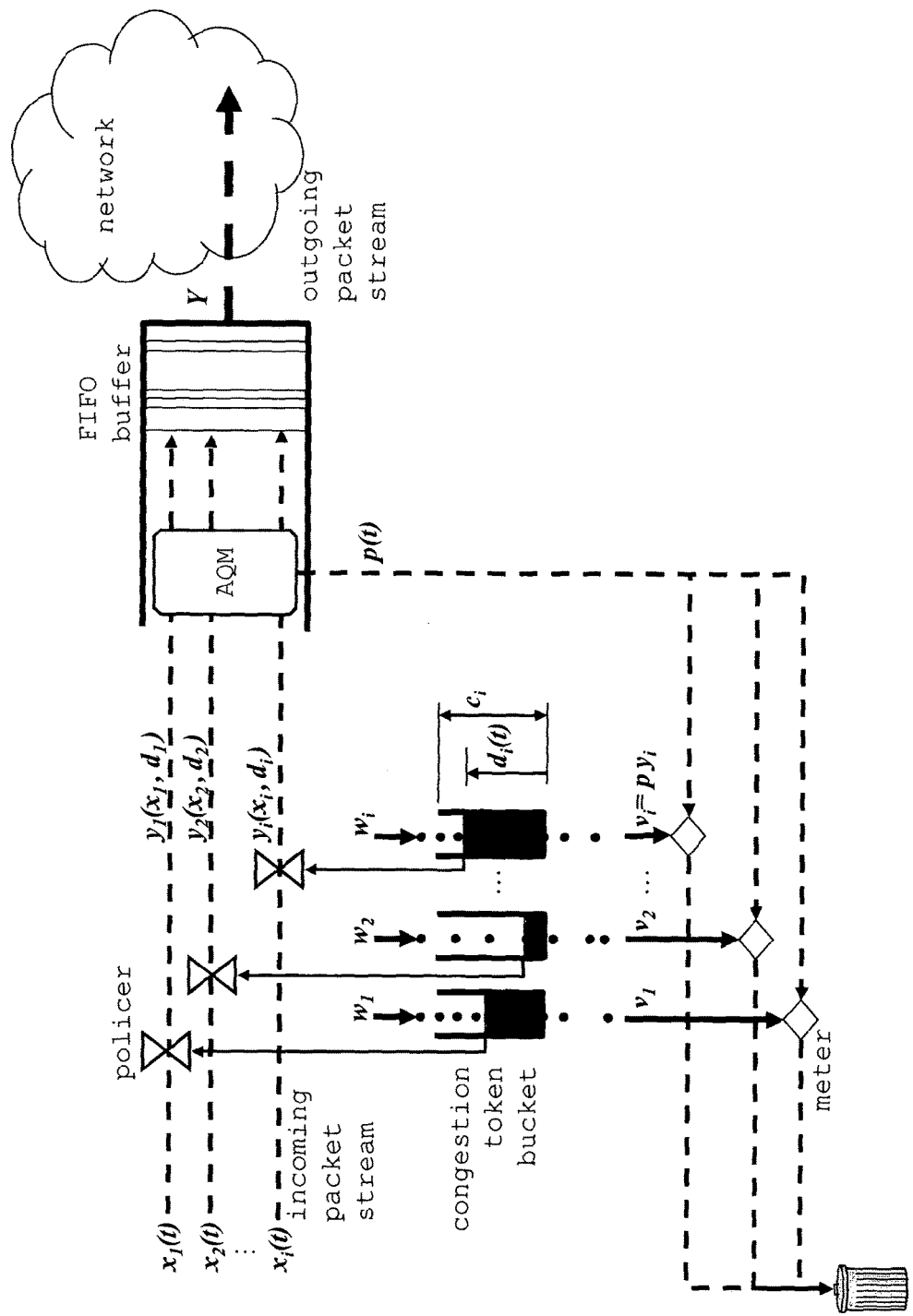
Figure 4: Out-of-band-congestion-token-bucket policing: Metering packets en route to discard

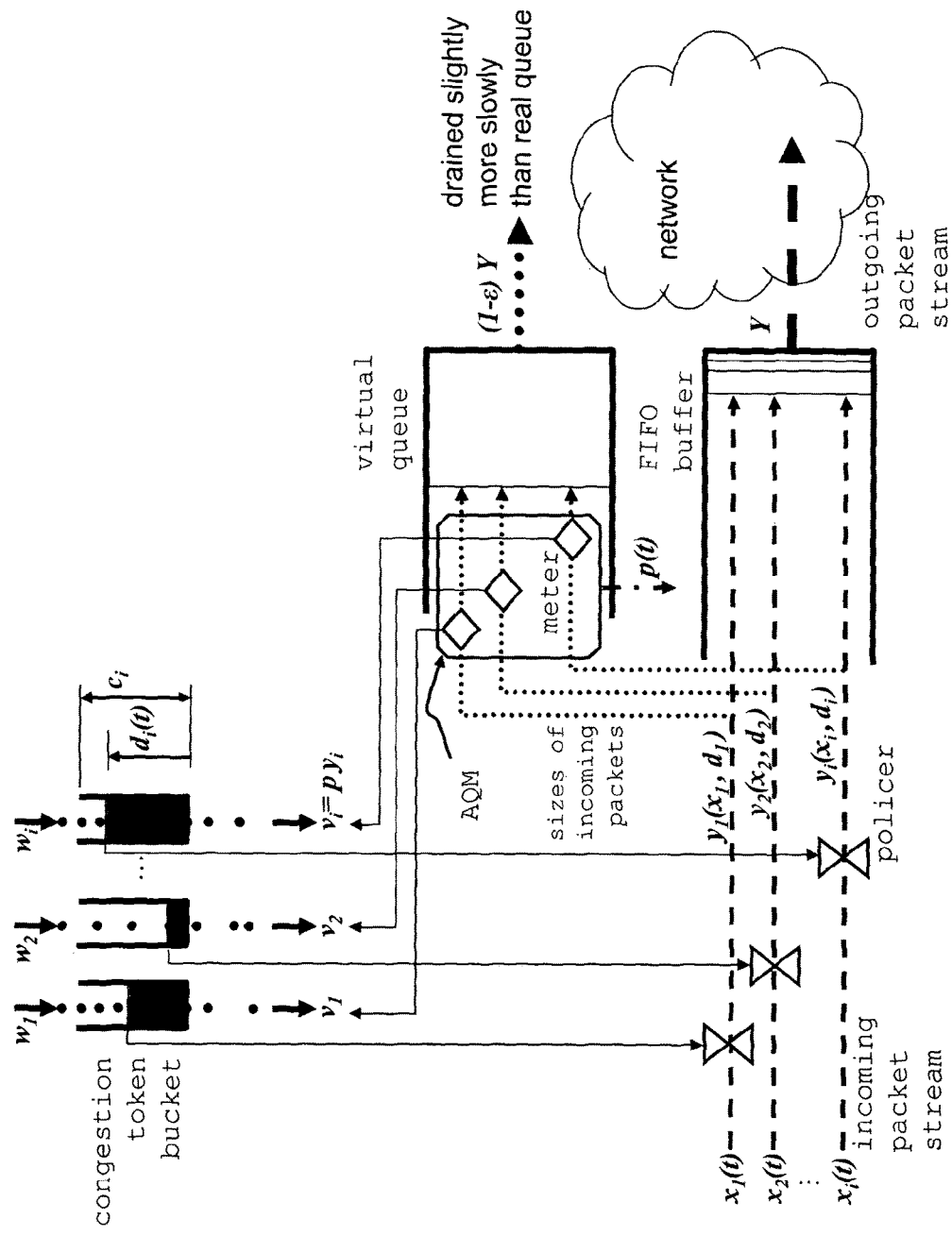
Figure 5: Out-of-band-congestion-token-bucket policing based on a virtual queue

ATTRIBUTION OF CONGESTION CONTRIBUTIONS

This application is the U.S. national phase of International Application No. PCT/GB2012/000746 filed 27 Sep. 2012 which designated the U.S. and claims priority to GB Patent Application No. 11250835.3 filed 30 Sep. 2011 and GB Patent Application No. 1122496.1 filed 29 Dec. 2011, the entire contents of each of which are hereby incorporated by reference.

TECHNICAL FIELD

The present invention relates to methods and apparatus for attributing contributions to congestion of a shared resource to respective user registers.

More specifically, aspects of the invention relate to methods and apparatus for attributing contributions to congestion of a shared resource (such as a data network or a forwarding node therein) to respective user registers, the resource being operable to serve requests for service such as data units requesting to be forwarded, the requests having user indications associated therewith indicating with which of a plurality of user registers they are associated. The user registers may be associated with users of a network, such as senders or receivers of data, and service determinations may be made and acted upon in dependence on contributions to congestion so-determined in relation to the serving of requests associated with the user registers and/or in relation to the service provided to users associated with the user registers.

BACKGROUND TO THE INVENTION AND PRIOR ART

We start by presenting, as background information, some basic concepts to facilitate the understanding of the numerous monitoring and policing techniques that are presented afterwards.

Packets

A data sender usually splits data to be sent into small units known as packets. Each packet consists of a header and a payload carrying the data to be delivered. The header contains fields defined by the relevant communication protocol. The great majority of packets carried by commercial networks nowadays are so-called IP packets. IP is the Internet Protocol. This ensures that a network of routers can forward any packet from the source to its destination. IP is a connectionless protocol—that means that the header information in each data packet is sufficiently self-contained for routers to deliver it independently of other packets; each packet could even take a different route to reach the destination.

Distributed Bandwidth Sharing and Congestion

Data traversing the Internet follows a path between a series of routers, controlled by various routing protocols. Each router seeks to move the packet closer to its final destination. If too much traffic traverses the same router in the network, the router can become congested and packets start to experience excessive delays whilst using that network path. Between routers, data also traverses switches and other networking equipment that may also become congested. Throughout the following description the term router congestion will be used to imply congestion of any network equipment, without loss of generality. If sources persist in sending traffic through that router it could become seriously overloaded (congested) and even drop traffic (when its buffers overflow). If sources still persist in sending traffic through this bottleneck it could force more routers to become congested, and if phenomenon keeps spreading, that can lead to a congestion collapse for the whole Internet—which occurred regularly in the mid-1980s.

The solution to that problem has been to ensure that sources take responsibility for the rate at which they send data over the Internet by implementing congestion control mechanisms. Sources monitor feedback from the receiver of the metric that characterises path congestion in order to detect when the path their data is following is getting congested, in which case they react by reducing their throughput—while they may slowly increase their rate when there is no sign of the path becoming congested.

The typical path characterisation metrics that sources monitor are the average roundtrip time (RTT) for the data path, the variance of the roundtrip time (jitter) and the level of congestion on the path. Congestion is one of the parameters controlling rate adaptation of a source sending data over a congested path.

The congestion level can be signalled either implicitly (through congested routers dropping packets) or explicitly (through mechanisms such as explicit congestion notification see next subsection). Currently the most common option is implicit signalling.

Sources using TCP are able to detect losses, because a packet loss causes a gap in the sequence; whenever a TCP source detects a loss, it is meant to halve its data transmission rate, but no more than once per round trip time, which alleviates the congestion on the router at the bottleneck.

Random Early Detection (RED)

Historically, routers would drop packets when they got completely saturated (which happens when a traffic burst cannot be accommodated in the buffer of the router) this policy is called drop-tail. Random early detection (RED) (discussed in reference "[RED]", bibliographic details of which are given later) is an improvement whereby routers monitor the average queue length in their buffer and when the average queue is higher than a given threshold, the router starts to drop packets with a probability which increases with the excess length of the queue over the threshold (see FIG. 3). RED is widely used in today's Internet because it avoids all flows receiving congestion signals at the same time (termed synchronisation) which would otherwise cause oscillations. RED also allows sources to react more promptly to incipient congestion and it keeps queues from growing unnecessarily long.

Explicit Congestion Notification

Explicit Congestion Notification (ECN) (see reference "[RFC3168]") further improves on RED by using a two-bit ECN field in the IP header to signal congestion. It runs the same algorithm as RED, but instead of dropping a packet, it sets its ECN field to the Congestion Experienced (CE) codepoint. The ECN standard requires the receiver to echo any congestion mark signalled in the data; for instance, a TCP receiver sets the Echo Congestion Experienced (ECE) flag in the TCP header, which the TCP source interprets as if the packet has been dropped for the purpose of its rate control. In turn the source then reacts to the congestion by halving its transmission rate.

ECN was originally defined for DECnet, the proprietary networking protocol developed by the Digital Equipment Corporation [DECbit]. As well as the idea being adopted in IP, it was also adopted in Frame Relay and ATM, but in these latter two protocols the network arranges feedback of the congestion signals internally, and the network enforces traffic limits to prevent congestion build-up (see [ITU-T Rec.I.371]).

The IEEE has standardised an explicit congestion approach where Ethernet switches not the end systems arrange to feedback the congestion signals, although the Ethernet device on the sending system is expected to co-operate by reducing its rate in response to the signals. The approach is tailored exclusively for homogeneous environments, such as data centres.

In the previously described approaches, each frame (or packet) carried just a binary flag and the strength of the congestion signal depended on the proportion of marked frames—effectively a unary encoding of the congestion signal in a stream of zeroes and ones. However, the IEEE scheme signals a multibit level of congestion in each feedback frame, hence its common name: quantised congestion notification or QCN (see [IEEE802.1Qau]).

Re-ECN

Re-ECN (see [re-ECN]) utilises a technique called re-feedback (discussed in [re-feedback] and in International application WO2005/096566) whereby packets indicate the congestion they are likely to experience on the rest of their path not just the congestion already experienced, that ECN indicates. It is similar to ECN but uses an extra unused bit in the packet header. This bit is combined with the two-bit ECN field to create four extra codepoints, as discussed in International application WO2006/079845.

The simplest way to understand the protocol is to think of each packet as having a different "colour" flag (where different "colours" correspond to different codepoints). At the start of a flow, a "green" flag ("FNE", meaning "Feedback Not Established") is used to indicate that the sender does not have sufficient knowledge of the path. Green flags are also used when the sender is unsure about the current state of the path.

By default packets are marked with "grey" flags. If they encounter congestion during their progress through the network the ECN marking applied by the congested router will be termed a "red" flag. The destination will feed back a count of the number of red flags it has seen. For every red flag it is informed of, the sender should mark an equivalent number of bytes it sends in a subsequent packet or packets with a "black" flag. The black flag re-echoes or reinserts the congestion feedback back into the forward-travelling stream of packets, hence the name "re-ECN". These black flags may not be modified once they have been sent by the sender. There is a small possibility that a black packet will in turn be marked red by a congested router, but the codepoints are chosen so that it is still possible to tell the packet was originally marked as black—such packets are described as coloured "black-red".

At any intermediate node the upstream congestion is given by the proportion of red flagged bytes to total bytes. Thus the continually varying congestion level is effectively encoded in a stream of packets by interpreting the stream of red or non-red markings as a unary encoding of ones or zeroes respectively. Similarly, the congestion level of the whole path is encoded as a stream of black or non-black markings. The expected downstream congestion from any intermediate node can then be estimated from the difference between the proportions of black flags and of red flags, as described in International application WO2006/079845.

The IETF is in the process of defining an experimental change to the Internet protocol (IP) based on re-ECN, called Congestion Exposure (ConEx) (see [ConEx-abstr-mech]).

Discussion of Prior Techniques

The distributed congestion control responses to congestion of every data source do not necessarily share bandwidth equitably or efficiently. Firstly this approach relies on sources voluntarily responding in the prescribed way to the presence of congestion. Secondly, even if all sources respond as prescribed, the source of every data flow would not be taking account of how active or inactive it had been over time relative to others. Thirdly, equity should be judged between entities with real-world identities (e.g. users or customers of a network) not abstract data flows. Otherwise some real world entities can simply create many more data flows than others.

Due to this, network operators generally limit usage of a shared network. This is generically termed "policing".

The physical capacity of a communications link provides a natural physical limit on the bit-rate that the users of that link can achieve. The link provided to attach a customer site (e.g. home or business) to a network physically limits (or physically polices) the customer's traffic.

However, often a logical rather than a physical limit is placed on the bit-rate to or from a customer site. This is because, as the peak bandwidth of access links has increased with advances in technology, average access link utilisation has decreased (currently 1% average utilisation during the peak period is typical). Therefore, when traffic from a large number of customers with low average utilisation is aggregated deeper into the network, it is uneconomic to provision shared capacity for the eventuality that every user might briefly use 100% of their access capacity.

Typically the average traffic from a large aggregate of customers is fairly predictable. It is possible for a network operator to provide enough capacity for this average, plus enough headroom to allow for daily variation. However, at peak times, everyone's experience is then determined by the heaviest users how many there are and how heavy they are.

Policing

A number of means have been devised to logically police usage of share capacity. Some are used in production networks, others are merely research proposals:

Token-Bucket Policing:

With reference to FIG. 1a, and as further discussed in [Turner86], the network operator allocates each customer i a contracted rate $u_i$ and a contracted burst size $b_i$. A token bucket policer is associated with each customer, which is essentially an account that stores a single number $d_i$ that characterises the customer's recent activity. Conceptually, $d_i$ is the time-varying depth of fill of the customer's token bucket, which is filled with tokens at constant rate $u_i$ and can store up to $b_i$ tokens. A meter measures the customer's traffic and removes tokens from the bucket for every byte transferred. Therefore, a customer sending at time-varying bit-rate $x_i$ will remove tokens from the bucket at rate $x_i$.

A policer regulates the rate $y_i$ at which the customer can send traffic dependent on the fill depth $d_i$ of the bucket. As long as the bucket is not empty ($d_i>0$), the policer does not impede the customer's data flow $x_i$. But whenever there are insufficient tokens in the bucket ($d_i=0$), arriving data is discarded. If the customer is under-utilising the contract, the bucket will be full, and further tokens filling the bucket will be discarded.

Variants are possible: e.g.:
 an overdraft at the bottom of the bucket where the probability of discard increases with the depth of the overdraft;
 delay rather than discard (termed shaping rather than policing)
 marking as out of contract, rather than discard (see RIO below).

Paired Token Buckets:

A customer may be offered an assurance that they will always be able to use a certain bit-rate (their committed information rate or CIR), but they will also be allowed to use up to a peak information rate (PIR) if shared capacity is available. The two rates are also associated with allowed burst sizes above the rate: respectively the committed burst size (CBS) and the peak burst size (PBS). A CIR/PIR contract is generally policed by paired token buckets, filled respectively at the two rates and with depths of the two burst sizes respectively. This arrangement is typically called a three colour marker (TCM), because they often mark (or 'colour') outgoing traffic with one of three different classes of service depending on whether both, one or neither bucket is empty [RFC2697, RFC2698].

The CIR/PIR approach was common in Frame Relay and ATM, and it is common today on a shared link where the access capacity technology includes a mechanism for sharing out the capacity (e.g. time-division multiplexing in cable networks or passive optical networks and code-division multiplexing in cellular networks). Link capacity is provisioned so that it can support the sum of all the committed information rates. The approach is also used for whole networks, not just links, for example differentiated services (DiffServ) networks [RFC2698]. For a network, the committed rate may not be guaranteed—shared capacity may be provisioned so that it has a high probability of satisfying all the committed rates.

Another variant assures just one committed rate not two, with one associated committed burst size, but also a peak burst size is also allowed if available capacity permits [RFC2697].

RED with in/Out (RIO):

RIO (further discussed in [Clark98]) separates the decision on which traffic is out of contract from the decision on whether to sanction out of contract traffic. It comes in two variants, each conceptually the dual of the other:

Sender-based policing: At the ingress to a network any of the above policer designs can be used to determine which traffic is in-contract and which out. But out-of-contract traffic is merely tagged as such, rather than discarded. In fact, the customer can tag their own traffic to indicate which out-of-contract packets are least important to them; then the network operator merely has to check that the traffic tagged as in-contract, does actually fit within the contracted traffic profile.

If there is congestion at any forwarding node deeper into the network, packets tagged as out-of-contract can be discarded preferentially before in-contract packets are discarded. The RIO scheme proposed that nodes deeper into the network could simply run two instances of the RED algorithm, one with aggressive thresholds for out-of-contract traffic, and the other with a regular threshold configuration.

Receiver-based policing: In this variant, the traffic is probabilistically marked with standard explicit congestion notification (ECN) if it passes through a congested queue. Then just before arriving at the receiver, the traffic is compared against the contracted profile using one of the policing techniques described above. But instead of discarding packets or tagging them out-of-contract, ECN markings are removed for all traffic within the profile.

Weighted RED (WRED):

WRED (further discussed in [WRED_Cisco]) is a variant of the sender-based version of RIO that has been widely implemented. Like RIO, on entry to the network, traffic is policed to a contract agreed with the customer. And like RIO, the policer tags rather than discards traffic that is out of profile. But rather than tag traffic as either in or out-of-contract, a WRED policer demotes out-of-contract traffic using potentially eight traffic class identifiers. For IP differentiated services, three classes are typically used, as standardised for the assured forwarding class of DiffServ [RFC2597]).

On interior routers, up to eight different sets of RED thresholds are configured for each class and one algorithm (rather than the two of RIO) determines the average queue length. Then each packet is compared against the thresholds relevant to its class, so that packets demoted to lower precedence classes will be more likely to be dropped.

U.S. Pat. No. 6,904,015 (Chen et al), entitled "Congestion avoidance profiles in a packet switching system", relates to a technique for implementing the weighted RED algorithm in hardware. In Chen's technique, a traffic conditioner stores a drop probability profile as a collection of configurable profile segments. A multi-stage comparator compares an average queue size (AQS) for a packet queue to the segments, and determines which segment the AQS lies within. This segment is keyed to a corresponding drop probability, which is used to make a packet discard/admit decision for a packet. In a preferred implementation, this computational core is surrounded by a set of registers, the purpose of which is to allow it to serve multiple packet queues and packets with different discard-priorities.

Bottleneck Flow Policing:

A technique sometimes referred to as penalty box policing [Floyd99] involves monitoring the discards from a FIFO queue to identify whether packets from particular flows are more prevalent among the discards than others. Numerous variants and improvements to the original idea were subsequently published, such as RED with Preference Dropping (RED-PD [Mahajan01]), Least Recently Used RED (LRU-RED [Reddy01]), XCHOKe [Chhabra02], and Approx. Fair Dropping (AFD [Pan03]).

The intent of these bottleneck flow policing mechanisms is to identify application data flows with a higher bit-rate than other flows, in order to police their rate down to the same as every other flow.

In-Band-Congestion-Token-Bucket Policing:

Referring to FIG. 1b, this is similar in operation to token bucket-policing, but it takes account of traffic only if it contributed to congestion. A prerequisite is that the proportion of the traffic's contribution to congestion elsewhere must have been tagged onto the traffic itself, as in-band congestion signalling. This is discussed further in [Jacquet08] and International application WO2006/082443, Typically each packet can either be marked or not, with a probability proportional to the congestion it has contributed to. This might be achieved with explicit congestion notification (ECN [RFC3168]) or congestion exposure (ConEx [ConEx-abstr-meth]). The meter measures only congestion marked packets and ignores the rest. It removes tokens from the congestion-token-bucket only for the bytes of marked packets. The network operator allocates each customer i a contracted congestion-bit-rate of $z_i$ and a contracted congestion burst size $c_i$. Conceptually these are represented by a fill-rate and depth as with the traditional token bucket. Again, when a customer's congestion-token-bucket is empty, the policer limits their bit-rate.

Variants are possible:

A dual token bucket might be used in which, as well as a defined token-fill-rate, the token-drain-rate is limited to a maximum. International application WO2010/109201 discusses this.

Instead of a binary congestion marking, each packet might be tagged with a real number between 0 & 1 signifying the level of congestion it has experienced. For example the feedback frames in quantized congestion notification (QCN) [IEEE802.1Qau] are tagged in this way. Then, the meter would count the congestion-bytes to be removed from the bucket as the number of bytes in a data frame multiplied by the numeric congestion level associated with the frame.

Weighted Fair Queuing (WFQ):

Referring to FIG. 1c, WFQ partitions capacity between the entities actively using a link, without wasting capacity on inactive entities. Entities might be defined as whole customers or individual data flows. Each entity is associated with a weight, so that deliberately unequal shares can be provided. Traffic from each active entity is partitioned into separate queues. Access to the shared line is arbitrated by a scheduler, which serves each queue for a certain proportion of time, $w_i/\Sigma w$, where $w_i$ is the weight associated with entity i and $\Sigma w$ is the sum of the weights of all active entities. This gives each customer an assured minimum proportion of the link capacity Y, equal to $w_i Y/\Sigma w$. If a customer sends more than this, their queue just builds up. If they send less, their queue drains and whenever their queue empties, even in the brief periods between packets, the scheduler will give the other customers a higher proportion of the link, because $\Sigma w$ will not include the inactive user's weight while they have no packet waiting in the queue. This is discussed further in [WFQ89] [WFQ_Cisco].

Deep Packet Inspection (DPI):

DPI machines use network processors to reconstruct application layer packet streams and identify which packets belong to which applications. It is then possible for the network operator to configure policies that discriminate against certain applications, which it infers are likely to occupy large amounts of capacity, but may not be particularly highly valued by most customers.

DPI machines are also configured to be able to recognise traffic from each individual customer and count total volume, or volume of a particular application(s) against each customer's account. A common approach is to combine the capabilities of the DPI machine to only limit the peer-to-peer file-sharing traffic of those users that have contributed a large proportion of the total traffic volume during the peak period of the day.

There is no standard DPI machine, the approach being entirely proprietary. But generally, the packet classification stage can be thought of as similar to the stage of all the schemes so far described that checks whether arriving traffic fits a profile, allowing traffic to be classified as in or out-of-contract. Alternatively, as with WRED, a spectrum between in and out can be defined.

Having classified how well traffic complies with a traffic contract, DPI boxes then use the full range of techniques already described to degrade out of contract traffic, ranging from discard to tagging for potential treatment elsewhere in the network if necessary.

In addition, DPI boxes may route certain classifications of traffic differently to improve or degrade its service.

Comcast's Protocol-Agnostic Congestion Management System:

Comcast's system (see [Fairshare]), developed in conjunction with Sandvine, takes the following steps:

It measures the volume of (upstream) traffic from each customer over a period of a few minutes and records the most recent per-customer metric.

The network monitors whether a particular segment is becoming congested.

If it is, the system identifies those users of that segment who have contributed most traffic in the recent past and assigns all their traffic to a lower priority class for a brief period.

Whenever the segment becomes congested, those users' traffic will then receive lower priority service than everyone else, and therefore may be delayed or dropped.

Once those customers reduce their contribution below a threshold, they are no longer assigned lower priority.

REFERENCES

[RED]: S. Floyd & V. Jacobson: "Random Early Detection gateways for Congestion Avoidance", IEEE/ACM Transactions on Networking, Vol 1-4 (397-413) August 1993.

[RFC3168]: Ramakrishnan, K. K., Floyd, S. & Black, D.: "The Addition of Explicit Congestion Notification (ECN) to IP", Internet Engineering Task Force Request for comments 3168 (September 2001).

[Chhabra02] Parminder Chhabra, Shobhit Chuig, Anurag Gael, Ajita John, Abhishek Kumar, Huzur Saran, and Rajeev Shorey. XCHOKe: Malicious source control for congestion avoidance at Internet gateways. In *Proc. IEEE International Conference on Network Protocols (ICNP'02)*. IEEE (November 2002)

[DECbit] Jain, R., Ramakrishnan, K. & Chiu, D., "Congestion Avoidance in Computer Networks With a Connectionless Network Layer," *Digital Equipment Corporation Technical report* DEC-TR-506 (1987)

[Floyd99] Floyd, S. & Fall, K., "Promoting the Use of End-to-End Congestion Control in the Internet," *IEEE/ACM Transactions on Networking* 7(4):458-472 (August 1999)

[ITU-T Rec. I.371]: "Traffic Control and Congestion Control in B-ISDN," ITU-T Recommendation I.371 (03/04) (March 2004) <http://www.itu.int/rec/recommendation.asp?type=folders(=e&parent=T-REC-I.371>

[Mahajan01] Ratul Mahajan, Sally Floyd, and David Wetheral. Controlling high-bandwidth flows at the congested router. In *Proc. IEEE International Conference on Network Protocols (ICNP'01)* (2001)

[Pan03] Rong Pan, Lee Breslau, Balaji Prabhaker, and Scott Shenker. Approximate fairness through differential dropping. *ACM SIGCOMM Computer Communication Review*, 33(2):23-40 (April 2003)

[Reddy01] Smitha A. L. Narasimha Reddy. "LRU-RED: An active queue management scheme to contain high bandwidth flows at congested routers," In *Proc Globecomm '01* (November 2001)

[re-feedback]: Briscoe, B., Jacquet, A., Cairano-Gilfedder, C. D., Salvatori, A., Soppera, A. & Koyabe, M.: "Policing Congestion Response in an Internetwork Using Re-Feedback", Proc. ACM SIGCOMM'05, Computer Communication Review 35(4): 277-288 ACM Press (August 2005).

[re-ECN]: B. Briscoe, A. Jacquet, T. Moncaster, A. Smith: "Re-ECN: Adding Accountability for Causing Congestion to TCP/IP", IETF Internet Draft draft-briscoe-tsvwg-re-ecn-tcp-09 (October 2010).

[ConEx-abstr-mech]: Mathis, M. & Briscoe, B., "Congestion Exposure (ConEx) Concepts and Abstract Mechanism," Internet Engineering Task Force Internet Draft draft-mathis-conex-abstract-mech-00 (October 2010) (Work in progress)

[IEEE802.1Qau]: "IEEE Standard for Local and Metropolitan Area Networks—Virtual Bridged Local Area Networks—Amendment: 10: Congestion Notification," IEEE Draft standard 802.1Qau Draft 2.4 (2006) Abstract URL: http://www.ieee802.orq/1/pages/802.1au.html

[Turner86]: Turner, J., "New Directions in Communications," IEEE Communications Magazine 24(10):8-15 (October 1986)

[RFC2697]: Heinanen, J. & Guerin, R., "A Single Rate Three Color Marker," Internet Engineering Task Force Request for comments 2697 (September 1999)

[RFC2698]: Heinanen, J. & Guerin, R., "A Two Rate Three Color Marker," Internet Engineering Task Force Request for comments 2698 (September 1999)

[Jacquet08]: Jacquet, A., Briscoe, B. & Moncaster, T., "Policing Freedom to Use the Internet Resource Pool," In: Proc Workshop on Re-Architecting the Internet (ReArch'08) ACM (December 2008)<http://www.bob-briscoe.net/pubs.html#polfree>

[WFQ89]: Demers, A., Keshav, S. & Shenker, S., "Analysis and Simulation of a Fair-Queueing Algorithms," Computer Communication Review (SIGCOMM'89) 19(4):1-12 (September 1989)

[WFQ_Cisco]: "Distributed Weighted Fair Queuing," Cisco Feature Guide Web page http://www.cisco.com/en/US/docs/ios/11_1/feature/guide/DWFQ.html (1992)

[Clark98]: Clark, D. D. & Fang, W., "Explicit allocation of best-effort packet delivery service," IEEE/ACM Transactions on Networking 6(4):362-373 IEEE Press (August 1998): DOI: http://dx.doi.org/10.1109/90.720870

[WRED_Cisco]: "Weighted Random Early Detection on the Cisco 12000 Series Router," Cisco Systems Feature Guide IOS Software Release 11.2(1)GS (April 2005)

[RFC2597]: Heinanen, J., Baker, F., Weiss, W. & Wroclawski, J., "Assured Forwarding PHB Group," Internet Engineering Task Force Request for comments 2597 (June 1999)

[Fairshare]: Bastian, C., Klieber, T., Livingood, J., Mills, J. & Woundy, R., "Comcast's Protocol-Agnostic Congestion Management System," *Internet Engineering Task Force Request* for Comments 6057 (December 2010)

[uTP10]: Norberg, A., "uTorrent transport protocol," BitTorrent.org BitTorrent Enhancement Proposals (BEPs) 0029 (January 2010) (Draft) http://www.bittorrent.org/beps/bep_0029.html Relevance of Prior Disclosures to the Present Invention:

Of these prior disclosures, those believed to be of most relevance to the present invention are:

In-band-congestion-token-bucket (IBCTB) policing (FIG. 1b)

Deep packet inspection

Comcast's Protocol-Agnostic Congestion Management System

Bottleneck flow policers

The first three are all able to focus limits on those customers that contribute more volume during periods of peak usage. In-band-congestion-token-bucket (IBCTB) policing is believed to be of most relevance to the present invention, because it precisely identifies only the volume that directly contributes to congestion in queues.

The other two (DPI and Comcast's solution) only broadly identify those contributing most volume during a time when congestion is generally high. But the sources of high volume may not actually coincide with the periods of congestion in the specific queues that are congested.

This is problematic, because new 'background' congestion control protocols [uTP10] have recently been deployed that will rapidly reduce in rate at the first signs of congestion, yielding to other 'foreground' traffic. The foreground traffic can then briefly transfer at high rate, thus finishing earlier so that the background transfer can resume and still finish hardly any later. Unfortunately, approaches like DPI and Comcast's solution cannot detect such a fast response to congestion, so they falsely accuse such traffic of contributing high volume during congestion, when in fact the precise opposite is true. Given that about 20% of Internet traffic was using uTP when it was introduced in early 2010, this is a critical omission.

In contrast, ECN marks the volume of traffic that is present in the queue during the very brief microseconds when congestion actually occurs. Therefore, in-band-congestion-token-bucket (IBCTB) policing correctly allows through traffic that is highly responsive to congestion, even if very high volumes of it are transferred. While it correctly limits traffic that contributes large amounts of volume during congestion without responding so rapidly.

In-band-congestion-token-bucket (IBCTB) policing may be thought of in some ways as an ideal solution, because it precisely identifies the volume of traffic that a customer contributes to congestion, therefore measures precisely how much that customer constrains the experience of other customers or equivalently, how much that customer requires the capacity of the network to be increased. In economic terms, it measures the precise marginal cost of traffic.

However, in-band-congestion-token-bucket policing inherently requires the packets to be tagged with congestion information in-band. Therefore, at least congestion exposure (ConEx) has to have been deployed and ideally explicit congestion notification (ECN) too. Both these deployments may not happen for some years and may not be widespread. They require coordinated steps to deployment involving both end systems and networks.

Preferred embodiments of the present invention aim to provide a mechanism that allows the profile of congestion contributed by a customer to be compared with the allowed profile for that customer, where the congestion contributed is communicated from the site(s) of congestion to the policer "out-of-band" of the traffic.

Bottleneck flow policers use a superficially similar mechanism to embodiments of the present invention. However, their goal is to identify application data flows as quickly as possible that are using a higher bit-rate than other flows. In complete contrast, an aim of preferred embodiments of the present invention is to allow different customers to run at completely different rates in the short term, but to identify which customers are persistently contributing more volume whenever congestion is high. In fact, certain embodiments of the present invention could well single out a customer even if there has never been an instant when she has sent faster than others—she may fall foul purely on the grounds of excessive persistence.

Unlike bottleneck policers, embodiments of the present invention involve accumulating a customer's contribution to congestion without any decay over time. In contrast, bottleneck policers rapidly decay or time-out contributions to congestion in order to calculate a near-instantaneous measure of rate based only on recent contributions to congestion. Instead of decaying congestion contributions with time, embodiments of the present invention compare the accumulated contribution to congestion against an allowed profile which also accumulates, but at a constant rate.

Because of its longer time horizon, preferred embodiments of the present invention inherently concern all the traffic associated with a customer, not individual application data flows. They accumulate contributions to congestion over periods when congestion may change and when a user may exhibit different levels of activity. As a consequence, they may deliberately treat lack of traffic from a customer (between flows) as a reprieve when congestion stops accumulating. In contrast, bottleneck policers are only concerned with the near-instantaneous rate of individual application data flows when they are running. If a large number of customers all became active together for a period, a bottleneck policer would not count the high level of congestion against any of the flows as long as they all caused approximately equal amounts of congestion over that period.

SUMMARY OF THE INVENTION

According to a first aspect of the present invention, there is provided a method of attributing contributions to congestion of a shared resource to respective user registers, said resource being operable to serve requests for service, each of a plurality of said requests having a user indication associated therewith indicating with which of a plurality of user registers the request is associated; the method comprising:
  repeatedly updating each respective user register in dependence on a predetermined characteristic of that user register;
  updating a multi-user congestion measure in dependence on received requests from users sharing said resource; and in respect of a received request:
    identifying from the user indication associated therewith the user register with which said request is associated;
    updating the state of said associated user register in dependence on said updated multi-user congestion measure; and
    determining the contribution to congestion of the shared resource attributable to said associated user register in dependence on the updated state of said associated user register.

According to preferred embodiments, the resource is operable to serve requests for service within a data network. It may be (or be provided in/by) a forwarding node in a data network, for example.

According to preferred embodiments, a request may be a data unit such as a packet, in which case the resource may be a network node operable to serve requests for service such as data units requesting to be forwarded via one or more data networks. The user indication in respect of a data unit may be indicative of a sender of the data unit; one or more intended receivers of the data unit; or an entity accountable for the sending and/or receiving of the data unit, for example.

According to preferred embodiments, the updated multi-user congestion measure may be communicated separately from the received request whereby to allow the state of the associated user register to be updated. For example, where the received request is a data unit such as a packet, the updated multi-user congestion measure may be communicated using a separate message, rather than using the data unit itself. Alternatively or additionally, a request for service that has been rejected may be re-used as the means to communicate the updated multi-user congestion measure whereby to allow the state of the associated user register to be updated.

According to preferred embodiments, the state of the associated user register may be updated by an amount that depends on a measure of the amount of the resource required to serve the request for service and on the multi-user congestion measure.

According to preferred embodiments, the step of updating the multi-user congestion measure may comprise updating the multi-user congestion measure in dependence on whether or not the resource serves the request for service.

According to preferred embodiments, the multi-user congestion measure may be updated in dependence on the state of a multi-user register itself updated in dependence on the received requests for service whereby to mimic how those requests would be served by a notional resource less capable than the actual shared resource. In such embodiments, the multi-user register can be thought of as a "virtual queue".

According to preferred embodiments, the user registers may be updated periodically in dependence on their respective predetermined characteristics. Alternatively or additionally, a user register may be updated in dependence on its respective predetermined characteristic in the event that a request is received having a user indication indicating an association with that user register.

According to preferred embodiments, the user registers may comprise modules implementing token bucket or leaky bucket functionality.

According to preferred embodiments, the method may further comprise making a service determination in dependence on the contribution to congestion so-determined in relation to the serving of requests associated with a particular user register and/or in relation to the service provided to a user associated with that user register. The method may then further comprise serving requests for service in accordance with the service determination so-made, or sending an indication of said service determination whereby to enable requests for service to be served in accordance with that service determination.

According to a second aspect of the present invention, there is provided an apparatus for performing a method according to the first aspect.

The various options and preferred embodiments referred to above and in the following description are applicable in relation to the first and second aspects.

Preferred embodiments of the present invention may be thought of as providing a compromise that may not give the full benefits of congestion-policing based on "in-band" congestion signals such as ConEx and/or ECN, but they can be deployed unilaterally, at a single box in the network.

They have some similarities to the IBCTB policing described above and illustrated in FIG. 1b, but according to preferred embodiments, should in general be deployed at locations in networks that are most likely to be congested, where they meter congestion locally, by associating each drop from a local queue with the customer that transferred the packet, rather than counting in-band explicit congestion marks on packets and associating them with customers. Then, as with the in-band-congestion-token-bucket policer, they drain each customer's congestion-token-bucket dependent on this locally counted congestion.

FIG. 2 illustrates a preferred embodiment that uses a technique which will be termed "out-of-band-congestion-token-bucket" (OOBCTB) policing. It can be seen that one bulk first-in first-out (FIFO) buffer is associated with the token-bucket policers of all the customers. The buffer is shown holding a queue of packets of varying sizes. This is the data-forwarding device that may become congested, which we have said would in general need to be located locally with the policer. Traffic from all the customers is served by this one simple buffer.

As the FIFO buffer fills, the queue length $q(t)$ increases. An active queue management (AQM) process, such as the RED algorithm described earlier, maintains a moving'average $q_{ave}$ of the queue length and discards an increasing proportion of packets. FIG. 3 illustrates the RED algorithm as an example function that uses an averaged measure of the queue length to determine the drop probability for each arriving packet p(t).

If this FIFO buffer becomes congested, each time a packet arrives that must be discarded, a meter within the AQM function counts the size of the packet and attributes the discard to the token bucket of the customer that sent it. This is done by removing the same number of tokens from the customer's bucket as the number of their bytes discarded at the FIFO buffer. Therefore the bucket of customer i will drain at rate $v_i=p_iy_i$, where $y_i$ is the bit-rate of customer that is allowed through the policer, and $p_i$ is the loss probability at the FIFO buffer. For random discards, $p_i$ will be the same for all customers, therefore we can say $p_i=p$ and $v_i=py_i$. This ensures that the customer's bucket drains at a rate proportionate to the amount of volume they contribute during congestion of the local queue.

In other respects, the token-bucket policer generally corresponds to the IBCTB policer already described (FIG. 1b). The bucket of each customer i is filled with congestion tokens at rate $w_i$. And if the level $d_i$ of a bucket drops to zero, newly arriving traffic from that customer is discarded until their bucket is replenished sufficiently by new tokens.

To achieve full effectiveness with this approach, the policer should be located at the point in the network where congestion occurs. ConEx and ECN allow packets to carry congestion information to the policer, which can be located in a control node at the 'customer-edge' of the network. In the absence of protocols such as ConEx, the policer generally has to be located at the congested device itself. If there were multiple points of congestion in the network, it would be harder to locate policers at all these points, because one fill rate associated with one customer must act as a shared feed to all the congestion-token-buckets for that customer one at each location.

According to alternative embodiments, it would be possible to achieve distributed token filling by combining embodiments of the present invention with distributed congestion-policer techniques such as those outlined in International application WO2011/045553). Although this would make it possible to deploy congestion policing without requiring deployment of any in-band congestion signalling, it would be necessary to have a mechanism to distribute tokens to all the policers from a central source.

BRIEF DESCRIPTION OF THE DRAWINGS

A preferred embodiment of the present invention will now be described with reference to the appended drawings, in which:

FIG. 1a illustrates the technique known as "Token-Bucket Policing";

FIG. 1b illustrates the technique which will be referred to as "In-Band-Congestion-Token-Bucket Policing";

FIG. 1c illustrates the technique known as "Weighted Fair Queuing";

FIG. 2 illustrates a technique that will be referred to as "Out-of-Band-Congestion-Token-Bucket Policing", which is used according to preferred embodiments of the invention;

FIG. 3 illustrates an example active queue management (AQM) function that may be used to determine the probability of packet discard from the FIFO buffer;

FIG. 4 illustrates a possible way to implement an "Out-of-Band-Congestion-Token-Bucket Policer" with minimal modification to existing hardware, by metering packets en route to being discarded; and FIG. 5 illustrates a variant of an "Out-of-Band-Congestion-Token-Bucket Policer" based on a virtual queue associated with a real FIFO buffer.

DESCRIPTION OF PREFERRED EMBODIMENTS OF THE INVENTION

With reference in particular to FIG. 2, a method according to a preferred embodiment will now be described.

The example embodiment shown in FIG. 2 will serve to explain how the Out-of-Band-Congestion-Token-Bucket (OOBCTB) policer works.

1. Classification:

When a packet arrives at the policer, a classifier (a sub-function within the policer that is not shown) determines which customer account i and therefore which token bucket i the packet is associated with. It may do this by inspecting the link layer source address or a virtual local area network (VLAN) identifier tag to determine which (possibly virtual) line the packet arrived from, or it may arrive on a physically distinct line from those of other customers, so that it can be directly associated solely with one customer.

2. Token Filling:

The time $t_i$ that bucket i was last filled will have been stored in a structure associated with the bucket. The elapsed time from then to the time now $t_{now}$ is determined, $\Delta t = t_{now} - t_i$. Then $t_{now}$ is stored as the new $t_i$. A number of tokens are added to the bucket equal to $\Delta t_i w_i$ where $w_i$ is the contracted fill-rate for that bucket (also stored with the bucket). However, the bucket cannot be filled more than its maximum depth $c_i$. Thus the new bucket level is $d_i \leftarrow \min(c_i, d_i + \Delta t_i w_i)$ 3. Policing:

The level $d_i$ of the relevant congestion-token-bucket is compared with the size $s_i$ of the packet in bytes. If the level is large enough, that is $d_i \geq s_i$, the packet is allowed to pass. Otherwise, if the level is smaller, $d_i < s_i$, the packet is discarded.

4. Enqueuing:

The length of the queue in the FIFO buffer is read to determine whether the packet can be enqueued. An active queue management algorithm such as RED is used to determine whether the packet should be discarded probabilistically dependent on the smoothed queue length. If the algorithm decides to enqueue the packet in the buffer, no further action is required and the process returns to step 1 for the next packet.

5. Metering and Token Draining:

If the AQM algorithm decides to discard the packet, the size $s_i$ of the discarded packet in bytes is metered and a number of tokens equal to this metric are drained (subtracted) from the associated token bucket, with the proviso that the bucket depth cannot go negative. That is the new bucket level $d_i \leftarrow \max(0, d_i - s_i)$. The process returns to step 1 for the next packet.

Note that in this preferred embodiment discards at the FIFO buffer lead to draining of the token bucket, while discards at the policer do not. This is preferred because otherwise discards at the policer would both be caused by an empty token bucket and also cause the token bucket to be empty, creating a vicious circle that would make it hard for a user to resume normal service once their bucket had become empty.

Also note that in this preferred embodiment the policing step precedes the enqueuing and metering steps. Otherwise, if policing followed enqueuing, the queue management algorithm would remove just enough traffic to keep the queue sufficiently short, then policing would unnecessarily remove more traffic. This would often leave the line idle, which is termed non-work-conserving, or simply underutilisation.

Instead discards at the policer should prevent out-of-contract traffic from being considered for queuing even, then out-of-contract traffic will not alter the token bucket's measure of how much congestion is caused by in-contract traffic that has been allowed to pass into the buffer.

Nonetheless, there is some scope for alternative embodiments to follow the above five steps in a different order to the preferred order enumerated above. For instance, the filling step may be done at any stage after classification, not necessarily straight after.

A numerical example scenario also referring to FIG. 2 will serve to explain the effect of the OOBCTB policer on different traffic streams. In this example, the variable $x_i$ denotes the arriving bit-rate of all the traffic of customer i and $y_i$ denotes the bit-rate of the same user's traffic departing from the policer.

Consider a line of rate Y=1 Gb/s shared by numerous customers, of which we will focus on two. Imagine a brief period $\Delta t_1$=50 ms when the FIFO buffer is having to discard 1% of packets (p=1%), and a first customer is transferring 20% of the bit-rate at that time ($y_1=x_1$=20%*1 Gb/s=200 Mb/s). Then 20% of 1% of the bytes will be attributed as congestion caused by customer 1. While if a second customer had quickly reduced their rate at the first sign of the 1% congestion level, say to 0.5% of the capacity ($y_2=x_2$=0.5%*1 Gb/s=5 Mb/s), then over this 50 ms period when the congestion level p for all customers is 1%, only 0.5% of 1% of the congested bytes will be attributed to this second customer. Thus, the tokens drained from each customer's bucket over this period #1:

$$V_{i,1} = \Delta t_1 v_i$$

$$= \Delta t_1 p y_i$$

$$V_{1,1} = 0.05\ s * 1\% * 1\ Gb/s * 20\% = 100\ kb$$

$$V_{2,1} = 0.05\ s * 1\% * 1\ Gb/s * 0.5\% = 2.5\ kb$$

Now imagine that, for a longer period $\Delta t_2$=4 seconds, the loss probability p falls to 0.001% and the second customer quickly increases its rate up to 50% of capacity considerably exceeding the volume transferred by the first customer. Then:

$$V_{i,2} \Delta t_2 p y_i$$

$$V_{1,2} = 4\ s * 0.001\% * 1\ Gb/s * 20\% = 8\ kb$$

$$V_{2,2} = 4\ s * 0.001\% * 1\ Gb/s * 80\% = 32\ kb$$

Therefore, over the whole 4.05 s period:

$V_1 = V_{1,1} + V_{1,2} = 100\ kb + 8\ kb = 108\ kb$ drained from customer 1's bucket $V_2 = V_{2,1} + V_{2,2} = 2.5\ kb + 32\ kb = 34.5\ kb$ drained from customer 2's bucket.

The volumes transferred by each customer over these two periods combined are:

$$X_{1,1} = 0.05\ s * 1\ Gb/s * 20\% = 10\ Mb$$

$$X_{2,1} = 0.05\ s * 1\ Gb/s * 0.5\% = 0.25\ Mb$$

$$X_{1,2} = 4\ s * 1\ Gb/s * 20\% = 800\ Mb$$

$$X_{2,2} = 4\ s * 1\ Gb/s * 50\% = 2{,}000\ Mb$$

$$X_1 = X_{1,1} + X_{1,2} = 810\ Mb$$

$$X_2 = X_{2,1} + X_{2,2} = 2{,}000.25\ Mb$$

Although the second customer transferred nearly 3 times the volume of the first customer, it achieved this while contributing under ⅓ of the congestion, therefore its congestion-token-bucket drained at slower than ⅓ of the rate of the first customer's. This is because it rapidly responded by reducing its rate drastically in response to congestion, and increasing again rapidly as soon as the congestion subsided.

Now imagine that both customers have a contract with the network operator that allows them to cause 20 kb/s of congestion, that is $w_1=w_2$=20 kb/s.

If the above behaviour continued over subsequent periods, the customers' token buckets would continue to drain at respectively:

$$v_1 = 108\ kb/4.05\ s, \approx 26.7\ kb/s,$$

$$v_1 = 34.5\ kb/4.05\ s, \approx 8.5\ kb/s,$$

Thus the first customer's token bucket drains faster than its fill rate of 20 kb/s. Therefore this bucket will eventually empty and the associated policer will start restricting the amount of traffic $y_1$ that the first customer can contribute down to much less than it sends, $y_1 \ll x_1$.

Meanwhile, even though the second customer is transferring much more volume, its bucket will remain full, because it is draining congestion tokens more slowly than the contracted fill-rate. This is because the second customer is highly responsive to brief periods of congestion, whereas the first is not. Therefore, the second customer will not be limited at all by the policer, $y_2=x_2$.

As soon as the policer reduces $y_1$, the proportion of congestion in the buffer attributed to customer 1 will also reduce (and congestion p is also likely to reduce, although that depends on everyone else's behaviour). This will reduce the drain rate $v_1=py_1$ from customer token bucket, which in turn will allow the bucket to fill faster than it drains. This, in turn again, will reduce or eliminate policer drops for customer 1. In the long run, customer 1's throughput will be limited to such a rate that it cannot cause more than its contracted rate of congestion.

Variants

Regular Token Filling:

The token filling step (step 2 above) need not be triggered by the arrival of a packet associated with token bucket i. Instead it may be triggered by timer interrupts to occur at regular intervals $\Delta t_i$. After each interval a number of tokens would be added to the bucket equal to $\Delta t_i w_i$ where $w_i$ is the contracted fill-rate for the bucket. As with the asynchronous (packet-triggered) token filling method above, the bucket cannot be filled greater than its maximum depth $c_i$, therefore the new token level is still $d_i \leftarrow \min(c_i, d_i + \Delta t_i w_i)$, the only difference being that $\Delta t_i$ is a constant in this case.

ECN as Well as Drop:

The buffer could be ECN-enabled. During congestion it would mark rather than drop any traffic that indicated it came from an ECN-capable transport (ECT). The token draining step would subtract as many tokens from the bucket as the size of the packet in bytes, whether the packet was dropped or ECN-marked to indicate congestion. However, if the packet was neither marked nor dropped, no tokens would be drained.

Note an important distinction between the out-of-band and in-band metering methods. The in-band meter uses a pre-existing marking on the arriving packet to determine whether to drain tokens from the bucket. Whereas the out-of-band meter drains the bucket dependent on the size of the local queue, due to only local congestion. Then it applies an ECN marking as an output signal. In the in-band case, ECN markings provide the input to the process. Whereas, in the out-of-band case, ECN markings are merely an output, and indeed they are in fact merely an optional output.

This is why the metering technique is termed out of band; because the metered quantity is not determined from signalling within the packets. Rather the metered quantity is signalled from the buffer to the token bucket without using the data packets to carry the signals. Typically these signals will be carried between the buffer and the policer over the machine's internal bus, which is why they are termed out-of-band.

Quantised Congestion Level:

Rather than draining the congestion-token-bucket dependent on a binary congestion notification (drop or mark), tokens could be drained dependent on the size of each packet and the congestion level of the buffer held as a real number. For instance, the packet size and congestion level could be multiplied together to determine how many tokens to drain.

Various Sanctions:

The first embodiment is framed within a policing scenario, but the main point is to combine a congestion-token-bucket with any policing function. The policer itself is not the main aspect; and various sanctions may be used, whether the same as the policing action described, whether the same as other previously disclosed policers, or different. Possible variations on the sanction applied include, but are not limited to:
  re-routing out-of contract traffic
  delaying out of contract traffic
  damaging out-of-contract traffic, for example truncating the payload but forwarding the header, perhaps with an out-of-contract indication that would distinguish it from other causes of packet damage or discard
  downgrading the class of service of out-of-contract traffic, rather than discarding it In this last case, because the policer does not remove out of contract traffic, more flexibility is allowable in the order of the five steps of the preferred embodiment. For instance the policing step can follow the enqueuing step and/or the metering and draining step.

Various Congestion Profile Comparator Designs:

A token bucket is a convenient way to compare the profile of congestion attributed to a user with a contracted profile, but it is not the only way to implement such a comparison function. Possible variations include, but are not limited to:
  a leaky bucket that fills with tokens as packets arrive and drains at a constant rate. A leaky bucket is merely the converse of a token bucket. Its external behaviour can be arranged to be identical to an equivalently sized token bucket by triggering the same action when it is full that the token bucket would trigger when it is empty.
  using various combinations of buckets, such as a dual token bucket that limits both the fill and drain rates, a single-rate three-colour marker, a dual-rate three-colour marker, and so forth
  considering traffic out of contract whenever the bucket depth is below a configured threshold rather than the size of the packet in question
  increasing the probability that the meter deems traffic out-of-contract the lower the bucket level is below a threshold, rather than a binary in-out decision
  using models with a similar outcome as a token bucket, but not implemented internally as a token bucket
  determining a measure of how much the traffic is out of contract dependent on the difference between a user's rate of congestion and the contracted congestion rate for that user.

No Sanction, Only Metering:

The first embodiment is framed within a policing scenario, but, as already pointed out above, the policing functionality of such embodiments is not necessarily different to that of previously disclosed policers. An important distinction lies, however, in the use of a congestion-token-bucket in combination with an action triggered by its level. For instance the congestion metering technique could be used to detect whether traffic is outside a congestion contract then trigger a potential range of management actions other than (direct) policing, including (but not limited to):
  triggering an alarm for the operator
  triggering a warning message to the customer
  increasing the usage price of a network service
  counting the volume of out-of-contract traffic, perhaps with a view to:
    charging a higher usage charge for the volume counted
    draining additional token buckets, which in turn might be designed to trigger policing or management actions
  triggering application of a penalty clause in a contract
  altering the per-user weights of a scheduler
  altering the profile or classification of a user Buffer Management Variants:

The first embodiment is framed within a scenario where the buffer uses the RED active queue management algorithm, but any other algorithm could be used, including (but not limited to):
  no queue averaging
  a simple threshold
  a different shape function to calculate the probability of discard or marking dependent on queue length
  no AQM algorithm at all (drop-tail)

Also, the first embodiment is framed within a scenario that uses a FIFO buffer, but other queuing disciplines may be appropriate, including (but not limited to):
  a buffer that is part of a more complicated queuing system, but is FIFO within itself
  a weighted scheduler, such as weighted round-robin or weighted fair-queuing
  a set of buffers with different scheduling priorities, but where the drop or marking probability of one buffer is dependent on the queue size in other buffers (e.g. [Gibbens02])

Classifier Variants:

The classifier may associate each packet with the customer account of the sender, the receiver, or some other entity held accountable for the traffic.

In relation to embodiments used within policing scenarios, policing is more likely to be applied close to the sender before traffic has traversed the network. Discarding out-of-contract traffic near a receiver serves little purpose as traffic will already have traversed the network. The source may reduce its rate in response to policer drops, but given the policer is designed to identify traffic sources that cause excessive congestion, it would seem inappropriate to assume the source will always respond sensitively to policer drops.

If the customer account to be used is that of the receiver, the classifier would typically use the destination address to associate each packet with a customer account.

The classifier may associate each packet with the account of a network provider, which in turn provides service to end-users, rather than associating each packet directly with each end-user. The network provider may itself offer its service commercially, or it may be a private concern, such as the network operator of a University campus or enterprise. In these cases, a service VLAN (S-VLAN) tag may typically be used to identify the appropriate user account.

Alternatively, identifiers unrelated to network addressing may be used to associate each packet with the correct customer account. For instance, the session identifier in the point-to-point protocol (PPP) may be used, or a cryptographically-generated identifier or sequence of identifiers.

Enqueuinq:

In the preferred embodiment, the drop decision is made on the packet in the process of being enqueued. This is not intended to preclude alternative queuing arrangements where the drop decision is made as packets are de-queued, or if packets are discarded from the middle of the queue.

Also, the drop decision may be made based on the size of a virtual queue that counts the size of packets arriving at a real queue but conceptually drains more slowly than the real queue.

In an alternative embodiment, the queue management algorithm could internally re-route packets towards an internal discard function, rather than immediately discard them (see FIG. 4). Then the token bucket associated with the appropriate user account could meter each packet en-route to this internal discard function, in order to drain an amount appropriate to the size of the packet. This alternative embodiment has, the advantage of decoupling changes to the queue management function from changes to the metering function. The AQM function does not have to be modified to include metering per customer, it only needs to be altered to re-route packets towards an internal discard function, rather than discard them itself. In certain existing implementations such decoupling may allow a pre-existing metering function to be used without alteration, which may be advantageous if the function is embodied in hardware that is hard to change.

Virtual Queue:

The preferred embodiment requires packets to be dropped in order to attribute congestion to each customer. In an alternative embodiment, packets could be virtually dropped in a virtual queue, rather than actually dropped. A virtual queue does not buffer packets, it is merely a counter that tracks the length of the fictitious queue of packets that would form if the line rate were somewhat slower than the real line. FIG. 5 shows a real queue with output rate Y and a virtual queue with a slightly lower output rate $(1-\varepsilon)Y$, where $\varepsilon \ll 1$. The length of packets arriving at the real queue is added to the counter representing the virtual queue.

This alternative embodiment is very similar to the preferred embodiment except the meters that drain tokens from each customer's token bucket monitor an active queue management process acting on the copies of the packet lengths arriving at the virtual queue, not at the real queue. If the aggregate input rate approaches the virtual output rate $(1-\varepsilon)Y$, the virtual queue grows. As the virtual queue grows, the probability of selecting a virtual packet as it arrives at the virtual queue increases. The meter attributes the size of such selected packets to the relevant token bucket and subtracts that packet's size from the token bucket, which itself is also merely a counter. In other respects, this alternative embodiment works in the same way as the preferred embodiment.

Normalised Weights:

The first embodiment has been described as if the fill-rates of each congestion-token-bucket are configured to known, fixed amounts.

Instead, fill-rates may be variable, depending on another aspect of the system. For instance, the fill-rate may be a part of a larger allowance allocated for multiple different purposes, e.g. processing and storage as well as bandwidth allocation. The amount of the allowance available for bandwidth allocation would then vary dependent on the amount used for the other purposes, and dependent on the algorithm used to divide up the larger allocation between its constituent parts.

Alternatively, a system could be devised where only the relative sizes of the weights would need to be configured, not their absolute values. In addition a parameter would need to be configured to set the proportion of customers it should aim to deem as out of contract effectively how strongly policing would focus onto a few customers.

Then, internally, the system could adjust all the weights proportionately in order to keep the fill-level $d_i$ of most queues close to the middle of their respective buckets, while allowing policing to focus on the configured few customers who were contributing the greatest proportion of congestion relative to their contracted shares.

Not Just Packets:

Embodiments of the invention could be applied equally to traffic arriving in datagrams, frames or other discrete units of data.

Distributed Fill-Rate:

Alternative embodiments may achieve or allow distributed token filling by combining appropriate embodiments of the invention with distributed congestion-policer techniques such as those outlined in International application WO2011/045553). Although this would make it possible to deploy congestion policing without requiring deployment of any in-band congestion signalling, it would generally be necessary to have a mechanism to distribute tokens to all the policers from a central source.

Distributed Buffers and/or Meters:

The first embodiment has been described in relation to a scenario where the buffer and meters are within the same machine as the token buckets. An alternative embodiment would be to distribute these elements in cases where it was more convenient for the actual buffers to be remote from the token buckets and policers. For instance, distributed arrangements include (but are not limited to) the following:

In a DOCSIS (data over cable system) cable system, the cable capacity is divided into channels separated using time-division multiplexing. A node central to a whole hybrid-fibre-coax cable called the cable-modem terminal server (CMTS) arbitrates access to each data channel, using a system of out-of-band messages. In the upstream direction, there are numerous buffers at least one in each cable modem on entry to the shared cable network. Thus, instead of the single FIFO buffer shown in FIG. 2, this system involves numerous buffers, each holding a logically separate queue of traffic, but all waiting to enter a single physical resource that is logically divided into time-slots.

Although not as straightforward as the simple single buffer of FIG. 2, it is possible for the CMTS to determine each customer's contribution to congestion by the number of unfulfilled or deferred requests for a slot to transmit data: This metered volume of congestion can then be used to drain a token bucket. The rest of the system may correspond to that already described.

A passive optical network (PON) uses time-division multiplexing in a similar way to a DOCSIS cable system. Although of course PONs differ from DOCSIS cable networks in many details, the approach, described above for DOCSIS translates directly into a PON scenario.

In a cellular system, the wireless spectrum is a shared link, conceptually similar to the shared cable in a DOCSIS system. In UMTS and LTE, the spectrum is separated into channels using code-division multiple access (CDMA). Similarly to cable, each mobile terminal (handset) has a buffer to queue data waiting to be allowed to transfer upstream over the radio spectrum. The radio network controller (RNC) serves a similar function to the CMTS in a cable network, arbitrating requests for transmission channels as the centre of the radio resource control system.

Again, determining each customer's contribution to congestion is not as straightforward as with the simple single buffer of FIG. 2), but it is conceptually similar to the cable case and, at high level, conceptually similar to the single buffer case.

In the downstream direction, all these systems involve a centralised buffer, and can be modelled on the simpler scenario depicted in FIG. 2.

Not Just Bandwidth:

The preferred embodiment has been described in a scenario where the resource being shared is the bandwidth of a communications link and the items queuing to use the resource are packets. The following non-exhaustive list of alternative embodiments would be possible, where the inventive concept is applied to other shared resources and other queued items:

Requests to use the call-processing resource of a call server

Requests to use the processing resource of a shared computer

Requests to use the storage resource of a shared pool of memory (e.g. disks)

Requests to use a processing resource in a workflow system, where the processing resource may represent a mechanical or human operated function not only a computing function (e.g. shared machines, field engineers, call-centre staff, etc.)

Vehicles using a road transport system

Units of usage of an energy supply network, supplying for example electricity or gas.

Combinations of Variants:

Further alternative embodiments may be created by combining a variant of one part of the preferred embodiment with a variant of another part. For instance, this virtual-queue-based embodiment (FIG. 5) could be combined with the embodiment where the AQM function re-routes packets towards the discard function (FIG. 4) rather than metering within the AQM function. Or the virtual queue variant could be combined with the ECN variant. In another example, the distributed fill-rate variant could be combined with the variant that applies to work-flow systems rather than packet forwarding systems.

Numerous combinations of the variants would be possible, so these few examples are not intended to represent an exhaustive list.

REFERENCES

[Gibbens02]: Gibbens, R. J. & Kelly, F. P., "On Packet Marking at Priority Queues," IEEE Transactions on Automatic Control 47(6):1016-1020 (June 2002)

The invention claimed is:

1. A method of attributing contributions to congestion of a shared resource to respective user registers, said resource being operable to serve requests for service received from users sharing said resource; the method comprising:
   repeatedly updating each respective user register; and
   updating a multi-user congestion measure in dependence on each of a plurality of requests for service received from users sharing said resource, the respective requests for service each having a user indication associated therewith indicating with which of said user registers the respective request for service is associated;
   wherein the repeated updating of each respective user register is performed in dependence on a predetermined characteristic of said respective user register, the respective characteristics of said respective user registers being individually settable; and
   wherein the method further comprises, in respect of one of the received requests for service:
      identifying from the user indication associated therewith the user register with which said request for service is associated;
      updating the state of said associated user register in dependence on said updated multi-user congestion measure;
      determining the contribution to congestion of the shared resource attributable to said associated user register in dependence on the updated state of said associated user register;
      making a service determination in dependence on the contribution to congestion so-determined in relation to the serving of requests for service associated with that user register and/or in relation to the service provided to a user associated with that user register; and
      serving requests for service in accordance with said service determination or sending an indication of said service determination whereby to enable requests for service to be served in accordance with said service determination.

2. A method according to claim 1 wherein said resource is operable to serve requests for service within a data network.

3. A method according to claim 1 wherein said requests for service comprise data units.

4. A method according to claim 3 wherein the user indication in respect of a data unit is indicative of one or more of: a sender of said data unit; one or more intended receivers of said data unit; or an entity accountable for the sending and/or receiving of said data unit.

5. A method according to claim 3 wherein the service requested comprises the forwarding of said data units via one or more data networks.

6. A method according to claim 1 wherein said updated multi-user congestion measure is communicated separately from said received request for service whereby to allow the state of said associated user register to be updated.

7. A method according to claim 1 wherein the state of said associated user register is updated by an amount that depends on a measure of the amount of said resource required to serve said request for service and on the multi-user congestion measure.

8. A method according to claim 1 wherein the step of updating the multi-user congestion measure comprises updating the multi-user congestion measure in dependence on whether or not said resource serves said request for service.

9. A method according to claim 1 wherein a request for service that has been rejected is re-used as the means to communicate said updated multi-user congestion measure whereby to allow the state of said associated user register to be updated.

10. A method according to claim 1 wherein the multi-user congestion measure is updated in dependence on the state of a multi-user register itself updated in dependence on said received requests for service whereby to mimic how said received requests would be served by a resource less capable than said shared resource.

11. A method according to claim 1 wherein each respective user register is updated in one or both of the following manners:
- periodically in dependence on the predetermined characteristic of that user register; and
- in dependence on the predetermined characteristic of that user register in the event of a request for service being received having a user indication indicating an association with that user register.

12. A method according to claim 1 wherein each user register comprises one or more modules implementing token bucket or leaky bucket functionality.

13. Apparatus for performing a method of attributing contributions to congestion of a shared resource to respective user registers, said resource being operable to serve requests for service received from users sharing said resource; the apparatus being configured to at least:
- repeatedly update each respective user register; and
- update a multi-user congestion measure in dependence on each of a plurality of requests for service received from users sharing said resource, the respective requests for service each having a user indication associated therewith indicating with which of said user registers the respective request for service is associated;

wherein the repeated update of each respective user register is performed in dependence on a predetermined characteristic of said respective user register, the respective characteristics of said respective user registers being individually settable; and wherein the apparatus is further configured to, in respect of one of the received requests for service:
- identify from the user indication associated therewith the user register with which said request for service is associated;
- update the state of said associated user register in dependence on said updated multi-user congestion measure;
- determine the contribution to congestion of the shared resource attributable to said associated user register in dependence on the updated state of said associated user register;
- make a service determination in dependence on the contribution to congestion so-determined in relation to the serving of requests for service associated with that user register and/or in relation to the service provided to a user associated with that user register; and
- serve requests for service in accordance with said service determination or send an indication of said service determination whereby to enable requests for service to be served in accordance with said service determination.

14. The apparatus according to claim 13 wherein said resource is operable to serve requests for service within a data network.

15. The apparatus according to claim 13 wherein said requests for service comprise data units.

* * * * *